UNITED STATES PATENT OFFICE 2,138,029

BAKING POWDER

Augustus H. Fiske, Warren, R. I., assignor to Rumford Chemical Works, Rumford, R. I., a corporation of Rhode Island No Drawing. Application June 3, 1937, Serial No. 146,204

9 Claims. (Cl. 99—95)

My present invention relates to an improved baking powder and particularly one in which the acid calcium tetraphosphates discovered by me and which I have disclosed in my application for Letters Patent Ser. No. 142,058, filed May 11, 1937, is used as an acid component.

There has been in the past few years a tendency in the baking powder world to stress so-called "delay action" and this has emphasized the fact that alum, alum phosphate and straight calcium orthophosphate baking powders have all delayed actions while cream of tartar baking powders have what is commonly termed "quick action".

In the case of a large batch of dough or batter, such as is used in a bakery, and where it is necessary to use mechanical equipment in mixing the materials, and where it takes a long while to thoroughly mix them, it is, perhaps, advisable to have a "delayed action" in the operation of the leavener so that the gas will not be dissipated out of the batter while the mechanical and long drawn out mixing process takes place. In the case of the housewife there is no doubt that a quick acting baking powder gives good results, and cream of tartar baking powder had become the standard and practically the only successful "quick acting" making powder for most domestic uses prior to my present invention.

In the production of salts and particularly acid salts, one of the immediate thoughts pertinent to their uses runs to that most important field of food products on which modern citivilization under its highly artificial systems of dietetics depends for general health and physical nurture in special lines lately found of fundamental importance, as, for example, in the feed of minerals for bone and metals for glandular supply.

In this development of the art there have been two characteristic schools which afford a background for a part of my present teaching.

One school sponsored the theory of non-mineral acid salts as in line with the vegetable and fruit foods long known to be wholesome and healthful for man. Another, developed through research and practice, advocated certain mineral salts, notably phosphates, as supplying bone growth and supplying and stimulating glands and other accessories for human metabolism.

Cream of tartar baking powder is a good leavener but it lacks the food value of the calcium phosphate baking powder. The residue from cream of tartar baking powder includes Rochelle salts, while in the residue from a calcium phosphate baking powder are the mineral food elements, calcium and phosphates.

In my present invention which contemplates a tetraphosphate baking powder, I have produced a calcium phosphate baking powder which gives off its entire gas strength in the cold and without the "delayed action" commonly believed to be characteristic of phosphate baking powders, and with the "quick action" of cream of tartar. Therefore I am able to make a baking powder containing the desirable mineral ingredients, phosphate and calcium, and yet have a leavening quality similar to cream of tartar. This is an interesting phase of the leavening field and adapts the tetraphosphate baking powder particularly to domestic uses and more particularly to those users who have come by long use to prefer a "quick acting" or cream of tartar type.

It is also possible to make a baking powder with my acid calcium tetraphosphate and sodium aluminum sulphate together as the active acid reactants. This baking powder would, however, be of "double acting" type having a quick reaction in the cold while the batter is being mixed and a slow reaction in the oven. This baking powder would not however be like an ordinary acid calcium orthophosphates mixture because the acid calcium tetraphosphate has a different speed of evolution of gas from bicarbonate of soda than the acid calcium orthophosphate and would give different baking results. This action of my acid calcium tetraphosphate with the sodium aluminum sulphate may be understood by comparing it with the action of the standard mixture of acid calcium orthophosphate and aluminum sulphate.

In the case of the orthophosphate and sodium aluminum sulphate there is a reaction first of two-thirds of the phosphate in the cold and one-third in the hot, and a reaction of one-third of the sodium aluminum sulphate in the cold and two-thirds in the hot. In the case of the acid calcium tetraphosphate there is the reaction of all of the acid calcium salt in the cold and none in the hot, and one-third of the sodium aluminum sulphate in the cold and two-thirds in the hot. There is a much greater cold reaction in proportion to the amount of phosphate present with the acid calcium tetraphosphate than with the acid calcium orthophosphate. In order to obtain the same degree of cold reaction in the ortho mixture it would be necessary to use about one-third more phosphate in the baking powder which would be more expensive.

Another advantage of my tetraphosphate baking powder is that it is much cheaper than cream of tartar baking powder. Cream of tartar is approximately twice as expensive as the phosphate and will neutralize 50% of its weight of bicarbonate of soda whereas my acid calcium tetraphosphate is capable of neutralizing 66% of its weight of bicarbonate of soda. Thus my baking powder can be made available to the public at a much lower price than any known cream of tartar baking powder. Bearing in mind that it combines with this economy the quick action of the cream of tartar and the valuable mineral foods of the phosphate, it will be recognized as of great practical importance in this art.

My baking powder made with acid calcium tetraphosphate, as the acid agent contains, by actual analysis, 14.8% total carbon dioxide. It has 12.6% gas evolved in the cold and 12.8% available. Therefore, the cold evolution and the available gas are practically the same. This is the same general action as that of a cream of tartar baking powder but its residues in the batter and bread are of higher food value. The variation between the cold and the available gas is within the limit of experimental error of the determination so that I may properly say that the available and the cold evolution are the same.

In my copending application, as indicated above, I have described the acid calcium tetraphosphate which I use in my baking powder. Prior to my discovery thereof such a compound was unknown. It is a white pulverulent or granulated substance and has the capacity, as indicated, of neutralizing from 25% to 66% of its own weight of bicarbonate of soda according to its calcium and phosphate content.

Both the bicarbonate of soda and tetraphosphate may be produced and mixed in either fine pulverulent or fine granular condition to ensure proper keeping qualities regardless of climatic conditions.

In the following formula I employ my acid calcium tetraphosphate having a neutralizing value of 66% of its weight of bicarbonate of soda:

| | Pounds |
|---|---|
| Bicarbonate of soda | 70 |
| Acid calcium tetraphosphate | 106¼ |
| Starch | 73¾ |
| Baking powder | 250 |

Other of the acid calcium tetraphosphates having lower neutralizing value may be substituted for the acid calcium tertaphosphate having the 66% neutralizing capacity used in the above formula, with a corresponding lessening of the amount of starch and an increasing amount of tetraphosphate. These give good results but the above formula represents what I believe to be the most economical and most satisfactory mixture which I have produced.

In the case of a tetraphosphate having a normal neutralizing value of 50% of its weight of bicarbonate of soda, a baking powder would be prepared on the following basis. An ordinary baking powder for domestic use would contain 28% of bicarbonate of soda. If the tetraphosphate had a neutralizing value of 50% it would take 56% of acid calcium tetraphosphate to neutralize it and so 16% of dried starch as a diluent would be needed. If the tetraphosphate had a neutralizing value of 40% of its weight it would require 70% of acid calcium tetraphosphate to neutralize the 28% of bicarbonate of soda and there would only be room for 2% of starch as a diluent. Therefore the limit of commercial use of the acid calcium tetraphosphate for baking powder is one having around 40% of its weight of bicarbonate of soda as its neutralizing value.

Summarizing, the advantages of my tetraphosphate baking powder are as follows:

1. It is particularly adapted to domestic use because the cold and the available gas are the same.
2. In this respect it resembles cream of tartar, the oldest, most expensive and best known "quick acting" leavener.
3. For the same equivalent leavening it may cost less than one-quarter as much as a cream of tartar baking powder.
4. It contains the calcium and the phosphate which are such desirable mineral foods.

As indicated above, it is possible to use my acid calcium tetraphosphate in admixture with sodium aluminum sulphate in baking powder as an acid ingredient. In the case of such baking powder the amount of acid calcium tetraphosphate should be so calculated that the sum of the neutralizing power of the acid calcium tetraphosphate and the sodium aluminum sulphate contained in the baking powder will exactly equal the amount of bicarbonate of soda in the mixture. For instance, in a baking powder containing 30 lbs. of bicarbonate of soda per 100 lbs. of baking powder, if the sodium aluminum sulphate is 18 lbs., and it will neutralize 100% of its weight of bicarbonate of soda, only the difference between 30 and 18, which is 12 lbs. of bicarbonate of soda remains to be neutralized by the phosphate, and since the acid calcium tetraphosphate will neutralize 66% of its weight of bicarbonate of soda, I calculate that it will require 18.2 lbs. of acid calcium tetraphosphate to complete the formula in an equivalent chemical manner.

One formula for this product is:

| | Pounds |
|---|---|
| Bicarbonate of soda | 30 |
| Sodium aluminum sulphate | 18 |
| Acid calcium tetraphosphate | 18.2 |
| Starch | 33.8 |
| | 100.0 |

Any proportions of the two acid ingredients may be used to complete the baking powder as for instance:

| | Pounds |
|---|---|
| Bicarbonate of soda | 30 |
| Sodium aluminum sulphate | 5 |
| Acid calcium tetraphosphate | 38 |
| Starch | 27 |
| | 100 | or:

| | Pounds |
|---|---|
| Bicarbonate of soda | 30 |
| Sodium aluminum sulphate | 28 |
| Acid calcium tetraphosphate | 3.3 |
| Starch | 27.7 |
| | 100.0 |

The foregoing formulae are satisfactory but may be variously modified to meet special needs or developments and are discussed with that in view. They are therefore to be taken as illustrative and not limiting in interpreting and applying my invention herein set forth.

What I therefore claim and desire to secure by Letters Patent is:

1. A baking powder comprising bicarbonate of soda and acid calcium tetraphosphate in intimate admixture.

2. A baking powder comprising constituents on the basis of substantially 70 pounds bicarbonate of soda, 106¼ pounds acid calcium tetraphosphate and 73¾ pounds starch to make a 250 pound mix.

3. A baking powder comprising an admixture of bicarbonate of soda, acid calcium tetraphosphate and sodium aluminum sulphate as its acid ingredients.

4. A baking powder comprising constituents on the basis of substantially 30 pounds of bicarbonate of soda, 18 pounds of sodium aluminum sulphate, 18.2 pounds acid calcium tetraphosphate and 33.8 pounds of starch, to make a 100 pound mix.

5. A baking powder comprising constituents on the basis of substantially 30 pounds of bicarbonate of soda, 5 pounds of sodium aluminum sulphate, 38 pounds acid calcium tetraphosphate and 27 pounds of starch to make a 100 pound mix.

6. A baking powder comprising constituents on the basis of substantially 30 pounds of bicarbonate of soda, 28 pounds of sodium aluminum sulphate, 3.3 pounds acid calcium tetraphosphate and 38.7 pounds of starch to make a 100 pound mix.

7. A baking preparation comprising bicarbonate of soda in an amount sufficient to give the desired leavening strength and an acid reactant comprising acid calcium tetraphosphate in an amount and of a strength to cause the mixture to evolve substantially all of the available gas strength in the cold.

8. The baking preparation of claim 7, the acid calcium tetraphosphate being present in an amount and of a strength to neutralize approximately 50% of its own weight of bicarbonate of soda.

9. The baking preparation of claim 7, the acid calcium tetraphosphate having the property of neutralizing more than 50% of its own weight of bicarbonate of soda, and a diluent is present in an amount to adjust the acid neutralizing value of the mixture to substantially 50% of its weight of bicarbonate of soda.

AUGUSTUS H. FISKE.